Feb. 16, 1943. H. A. TRUE 2,311,141
DENTAL SEPARATOR
Filed March 26, 1940
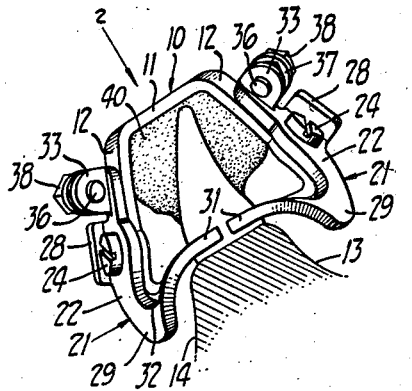
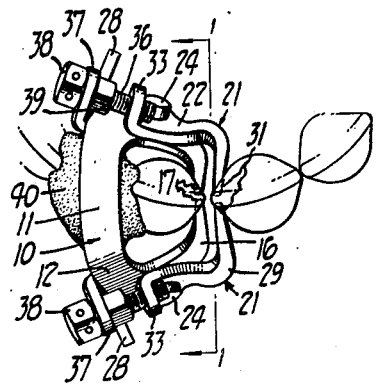
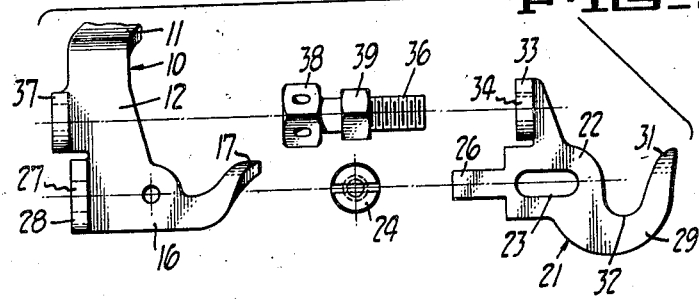
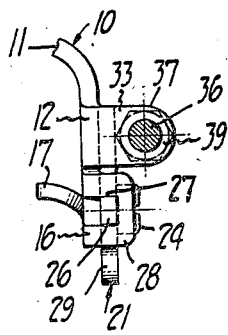
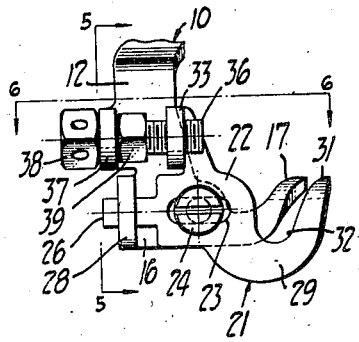
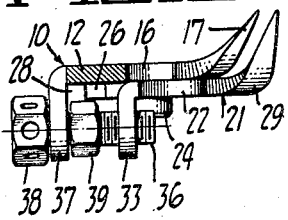
INVENTOR
Harry A. True
BY
ATTORNEY Patented Feb. 16, 1943

2,311,141

UNITED STATES PATENT OFFICE 2,311,141

DENTAL SEPARATOR

Harry A. True, San Francisco, Calif., assignor to Board of Trustees of College of Physicians and Surgeons, San Francisco, Calif., a public trust Application March 26, 1940, Serial No. 326,001

3 Claims. (Cl. 32—64)

My invention relates to dental instruments and is concerned more particularly with the provision of an improved dental separator for separating teeth to facilitate dental work thereon.

It is a general object of my invention to provide an improved dental separator which is of universal application in its arrangement with respect to the teeth and which places all of the mechanism to one side of the point of separation to allow free use of instruments in cavity preparations, the placing of foil and similar operations.

Another object of my invention is to provide a dental separator of the character referred to which is of a simple and efficient construction to facilitate its use in separting teeth, and in which the sets of separating jaws are independently movable to adapt the separator more readily to irregularities of the teeth.

Other objects and advantages of my invention will be apparent from the following description of a preferred embodiment thereof as illustrated in the accompanying drawing, in which:

Figure 1 is a side elevational view of a dental separator embodying my invention as applied to separate adjacent incisors.

Figure 2 is a plan view of the dental separator shown in Figure 1 and also illustrating the application of the separator to dentures.

Figure 3 is an exploded view illustrating the various parts of the dental separator.

Figure 4 is an end elevational view of the separator.

Figure 5 is a sectional elevational view taken as indicated by the line 5—5 in Figure 4.

Figure 6 is a sectional elevational view taken in a plane indicated by the line 6—6 in Figure 4.

Referring to Figures 1 and 2, the dental separator of my invention may include an arched frame or yoke 10 which is preferably formed of sheet metal and carries the separating jaws as described more particularly hereinafter. The yoke may include a central portion 11 which is adapted to span the end of an adjacent tooth, and similar side portions 12 formed to provide the yoke-shape. As seen most clearly in Figure 1, the side portions 12 are divergent with respect to each other, and with respect to central portion 11 are formed at an angle greater than 90° to correspond generally to the lingual and labial side surfaces of the teeth and gums, indicated at 13 and 14. At its end, each side portion 12 has an integral extension 16 terminating in a tapering jaw 17 which is curved in the direction of the yoke portion 11 and also inwardly with reference to the extension 16. In this way, the tapered jaw end is disposed in the direction of the teeth to be separated and has its pointed end lying in a plane substantially parallel to the central portion 11 of the yoke.

Associated with each fixed jaw 17 is a movable jaw member 21 which is mounted for sliding movement on a side portion 12 of the yoke. As seen most clearly in Fig. 3, each movable jaw member 21 has a body portion 22 provided with an elongated slot 23 for engagement by fastening and guide screw 24 which is threaded into one side of the yoke. Parallel with the slot 23, each jaw member 21 is provided with an extension 26 which is preferably of square or rectangular contour to engage in and be guided by a complemental aperture 27 in an offset ear 28 of the associated side 12 of the yoke. The rectangular extension 26 and the complemental aperture 27 coperate to prevent twisting of the jaw member on the yoke. Stud 24 and slot 23 also aid in resisting any twisting strains. The jaw end of the jaw member 21 extends downwardly from the body portion 22 as viewed in Figure 3 to form extension 29 which then curves upwardly and is turned inwardly to form a tapered jaw 31 lying generally in the plane of the associated jaw 17 of the frame 10 and in side-by-side relation therewith. As shown in Figure 3 the extension 29 of each jaw member 21 is cut away on one side as at 32 to facilitate access to the teeth to which the separator is applied.

To control relative adjusting movement of each pair of jaws 17 and 31, each jaw member 21 (Figs. 3 to 6) is provided with a laterally extending ear 33, having a threaded aperture 34 therein with its axis lying parallel to the longitudinal axis of the slot 23 and the guide extension 26. The threaded aperture 34 is adapted for engagement with an adjusting stud 36 which is journalled in an ear 37 of the adjacent side portion 12 of the yoke. Stud 36 is held against endwise movement relative to ear 37 by means of an apertured head 38 and a nut 39 threaded on the stud 36 but secured in fixed position thereon by any suitable means, so as to transmit thrust between the screw 36 and ear 37 of the yoke.

In operation the separator is applied to the teeth with the jaws 17 and 31 closed and in position between the pair of adjacent teeth to be separated, for example between the two central incisors, as shown in Figures 1 and 2. To support the yoke in place and to prevent tipping thereof, modeling compound 40 of the usual character employed in dental work may be applied between the yoke and adjacent teeth, as shown in Figures 1 and 2. When the compound has hardened so that the separator is held in position relative to the teeth, a suitable tool may be applied to turn the studs 36 and thereby effect lineal movement of the movable jaw 31, whereby a separating force is applied between adjacent teeth and they are spread apart to allow access to the tooth surface to be treated.

The dental separator is universal in its application, so that it can be disposed with either side on the labial or lingual side of the teeth. In this way the entire mechanism can be disposed in a desired location remote from the surface of the tooth to be treated, and at either side of the separation as selected by the dentist. The recessing of the jaws of the separator, particularly the movable jaws as shown at 32, facilitates access to the base of the teeth and provides a working clearance in this region. It will be noted that the independent movement of opposite movable jaws allows the dental separator to adapt itself readily to irregularities of the teeth. The linear movement of the movable jaws provides for an equal stable separating force on the teeth which is controlled and directed by the firm positioning of the yoke.

For use with cuspids, bicuspids, or molars, the dental separator is proportioned in accordance with the size of the teeth to which it is to be applied. The construction is substantially identical for various sizes and varies only in the location of the bend between central portion 11 of the frame and each side portion 12 thereof. Also, the yoke construction provides ample space between side portions 12 thereof so that only a small number of separator sizes are required for use on all teeth.

I claim:

1. A dental separator comprising an arched frame terminating in opposed end portions displaced laterally with respect to the central portion of the frame, said end portions being adapted for positioning along the labial and lingual sides of the teeth respectively and terminating in opposed fixed jaws, and a movable jaw member associated with each of said fixed jaws and connected thereto for relative sliding movement, each of said movable jaw members having an end portion extending downwardly and then upwardly and inwardly to provide a movable jaw in alignment with the associated fixed jaw, said downwardly and then upwardly extending portions forming recesses providing for access to the teeth with which said jaws are engaged in a direction laterally of the teeth.

2. A dental separator comprising an integrally formed arched frame having a central portion for positioning over the teeth and a pair of diverging side portions, said side portions having lateral extensions formed inwardly and upwardly to provide opposed fixed jaws, a movable jaw member connected to each of said side portions for lineal movement, each movable jaw member having an end portion extending downwardly and then upwardly and inwardly to provide a movable jaw in alignment with the associated fixed jaw, the connection between each of said movable jaw members including means preventing twisting movement of the movable jaw relative to the frame and means for effecting individual lineal adjusting movement of said movable jaw member on said frame, said central portion of said frame being displaced laterally from said jaws and providing the only structure of the separator extending across the teeth from side to side thereof.

3. A dental separator comprising a yoke having a central portion for spanning the teeth and side portions extending in divergent relation from the central portion to conform generally to the labial and lingual side surfaces of the teeth and gum, said side portions terminating in opposed inwardly extending jaws laterally offset from said central yoke portion, a movable jaw member mounted on each side portion of said yoke and having an adjustable connection therewith, said jaw member including an end portion extending downwardly and then upwardly and inwardly to provide a movable jaw in alignment with the associated yoke jaw, said downwardly and then upwardly extending end portions forming recesses providing for access to the teeth with which said jaws are engaged in a direction laterally of said teeth, and said end portion constituting the only separator structure spanning the separation caused between adjacent teeth.

HARRY A. TRUE.